United States Patent
Bublitz et al.

(10) Patent No.: US 9,582,927 B2
(45) Date of Patent: Feb. 28, 2017

(54) MULTIFOCAL REPRESENTATION DEVICE AND MULTIFOCAL REPRESENTATION METHOD FOR THE THREE-DIMENSIONAL REPRESENTATION OF AN OBJECT

(71) Applicant: Carl Zeiss AG, Oberkochen (DE)

(72) Inventors: Daniel Bublitz, Rausdorf (DE); Enrico Geissler, Jena (DE); Tobias Breuninger, Herbrechtingen (DE); Norbert Kerwien, Moegglingen (DE); Christoph Nieten, Jena (DE)

(73) Assignee: Carl Zeiss AG, Oberkochen (DE)

( * ) Notice: Subject to any disclaimer, the term of this patent is extended or adjusted under 35 U.S.C. 154(b) by 33 days.

(21) Appl. No.: 14/415,805

(22) PCT Filed: May 28, 2013

(86) PCT No.: PCT/EP2013/060921
§ 371 (c)(1),
(2) Date: Jan. 20, 2015

(87) PCT Pub. No.: WO2014/012694
PCT Pub. Date: Jan. 23, 2014

(65) Prior Publication Data
US 2015/0178980 A1 Jun. 25, 2015

(30) Foreign Application Priority Data
Jul. 20, 2012 (DE) .................. 10 2012 212 801

(51) Int. Cl.
*G06T 15/00* (2011.01)
*G06T 15/20* (2011.01)
(Continued)

(52) U.S. Cl.
CPC .............. *G06T 15/20* (2013.01); *G02B 21/22* (2013.01); *G02B 21/365* (2013.01);
(Continued)

(58) Field of Classification Search
CPC ............. H04N 13/042; H04N 13/0495; H04N 13/0493; G02B 21/22; G02B 27/2278; G02B 21/365; G06T 15/20
(Continued)

(56) References Cited

U.S. PATENT DOCUMENTS 5,880,711 A    3/1999    Tamada
6,518,940 B2   2/2003    Nagano
(Continued)

FOREIGN PATENT DOCUMENTS

DE    102006025149 A1    12/2007
DE    102005034990 B4    11/2008
(Continued)

OTHER PUBLICATIONS

Forster et al., Complex Wavelets for Extended Depth-of-Field: A New Method for the Fusion of Multichannel Microscopy Images. Microscopy Research and Technique 65 (2004): 33-42, 2004, 10 pages.
(Continued)

*Primary Examiner* — Phu K Nguyen
(74) *Attorney, Agent, or Firm* — Skaar Ulbrich Macari, P.A.

(57) ABSTRACT

A multifocal representation device with a digital image generation module and a control unit, which conveys to the digital image generation module two-dimensional image data of a three-dimensional object to be represented, is provided, wherein the digital image generation module, based on the two-dimensional image data conveyed, generates two-dimensional images of the object from at least two different object planes in corresponding different focal planes in such a way that an observer can focus with his eye on the different focal planes in order to perceive the represented object three-dimensionally, and wherein the control
(Continued)

unit determines for each two-dimensional image to be represented a sharpness value in sections and sets the image data to dark for the image sections the sharpness value of which lies outside a sharpness value range predetermined for the image.

13 Claims, 2 Drawing Sheets

(51) Int. Cl.
  *G02B 21/22* (2006.01)
  *G02B 27/22* (2006.01)
  *H04N 13/04* (2006.01)
  *G02B 21/36* (2006.01)

(52) U.S. Cl.
  CPC ....... *G02B 27/2278* (2013.01); *H04N 13/042* (2013.01); *H04N 13/0493* (2013.01); *H04N 13/0495* (2013.01)

(58) Field of Classification Search
  USPC ........................................ 345/419, 420, 428
  See application file for complete search history.

(56) References Cited

U.S. PATENT DOCUMENTS

| | | | |
|---|---|---|---|
| 6,798,390 | B1 | 9/2004 | Sudo et al. |
| 6,871,083 | B2 | 3/2005 | Kuroda |
| 6,909,552 | B2 | 6/2005 | Dohi et al. |
| 7,417,213 | B2 * | 8/2008 | Krief .................... G02B 21/244 250/201.3 |
| 7,446,733 | B1 | 11/2008 | Hirimai |
| 7,525,541 | B2 | 4/2009 | Chun et al. |
| 7,586,676 | B2 | 9/2009 | Sander |
| 7,859,484 | B2 | 12/2010 | Ito |
| 7,889,425 | B1 | 2/2011 | Connor |
| 7,957,061 | B1 | 6/2011 | Connor |
| 7,978,407 | B1 | 7/2011 | Connor |
| 8,050,471 | B2 | 11/2011 | Mielekamp et al. |
| 8,068,131 | B2 | 11/2011 | Horimai et al. |
| 8,411,931 | B2 * | 4/2013 | Zhou .................. H04N 13/0029 375/240.16 |
| 8,941,691 | B2 * | 1/2015 | Baron .................... G09G 3/003 345/6 |
| 2007/0069106 | A1 | 3/2007 | Krief et al. |
| 2009/0073557 | A1 | 3/2009 | Ito |
| 2009/0322741 | A1 | 12/2009 | Ito |
| 2011/0310121 | A1 | 12/2011 | Baron |
| 2013/0076889 | A1 | 3/2013 | Bublitz et al. |
| 2013/0076960 | A1 | 3/2013 | Bublitz et al. |
| 2014/0049633 | A1 | 2/2014 | Pretorius et al. |

FOREIGN PATENT DOCUMENTS

| | | |
|---|---|---|
| WO | 7900308 A1 | 6/1979 |
| WO | 02054347 A2 | 7/2002 |

OTHER PUBLICATIONS

English translation of the Written Opinion of the International Searching Authority for International Application PCT/EP2013/060921, Jan. 20, 2015, 11 pages.

* cited by examiner

MULTIFOCAL REPRESENTATION DEVICE AND MULTIFOCAL REPRESENTATION METHOD FOR THE THREE-DIMENSIONAL REPRESENTATION OF AN OBJECT

PRIORITY

This application claims the benefit of German Patent Application No. 102012212801.8, filed on Jul. 20, 2012, which is hereby incorporated herein by reference in its entirety.

FIELD

The present invention relates to a multifocal representation device with a digital image generation module and a control unit.

BACKGROUND

Conventional multifocal representation devices and conventional multifocal representation methods disclosed in U.S. Pat. No. 5,880,711. As the two-dimensional images are generated in at least two different focal planes, for an observer the contrast drops in comparison with the representation of a single image, wherein the reduction in the contrast increases sharply with the number of focal planes.

SUMMARY

The present invention in certain embodiments relates to a multifocal representation device with a digital image generation module and a control unit, which conveys to the digital image generation module two-dimensional image data of a three-dimensional object to be represented, wherein the digital image generation module, based on the two-dimensional image data conveyed, generates two-dimensional images of the object from at least two different object planes in corresponding different focal planes in such a way that an observer can focus with his eye on the different focal planes in order to perceive the represented object three-dimensionally. Further, in certain embodiments, the present invention relates to a multifocal representation method for the three-dimensional representation of an object in which two-dimensional images of the object are generated from at least two different object planes in corresponding different focal planes in such a way that an observer can focus with his eye on the different focal planes in order to perceive the represented object three-dimensionally.

An object of certain embodiments of the invention includes a multifocal representation device, wherein the reduction in contrast for the observer is decreased. Further, a corresponding multifocal representation method is provided.

According to certain embodiments of the invention, the object is achieved in the case of a multifocal representation device where for each two-dimensional image to be represented, the control unit determines a sharpness value in sections and sets the image data to dark for the image sections the sharpness value of which lies outside a sharpness value range predetermined for the image.

It is thereby advantageously achieved that, during the image representation, due to the image sections set to dark, there is a better contrast in comparison with the case without image sections set to dark. Therefore, the image sections which are blurred in the respective focal plane, and are represented dark, no longer lead to the undesired loss in contrast.

In particular, in the example case of each two-dimensional image to be represented, the control unit can generate image data of the object in the image sections in which the corresponding sharpness value lies within the sharpness value range predetermined for the image. Thus the sharp image sections are (brightly) represented in the respective focal plane only if image information is present in the sharp image sections.

The digital image generation module preferably generates the two-dimensional images in such a way that an observer can perceive them as a virtual image. Furthermore, the sharpness value range for each image can be the same for the different focal planes. However, it is also possible for it to be different for images with different focal planes. In particular, the sharpness value range can have a first limit value, wherein, when the limit value is exceeded or fallen below, a sharpness value which lies outside the predetermined sharpness value range exists.

The digital image generation module can comprise a digital image generator and a detection optical system, wherein the detection optical system represents the image generator to an observer in different focal planes time-sequentially.

For this, the detection optical system can have a variable optical element, such as e.g. a liquid lens, an optical system with variable focusing (e.g. conventional slide focus) and/or two elements which are not plane-parallel, the opposite surfaces of which are formed complementary to each other, wherein at least one of the elements is movable transverse to the imaging direction.

The digital image generation module can further comprise several digital image generators and a detection optical system, which represent the image generators to an observer in different focal planes simultaneously. In the process, the digital image generators can have different optical distances to the image plane in which the images are represented superimposed.

The digital image generator(s) can be formed as flat image generators or so-called light modulators. In particular, they can be formed in each case as a tilting mirror matrix, LCD module, OLED matrix or LCoS module. The digital image generator(s) can be formed as a passive image generator or as an active image generator.

Furthermore, the digital image generation module can be formed such that the two-dimensional images generated are multicolored. For this, it can bring about a time-sequential generation of color subframes or a simultaneous generation of color subframes.

The digital image generation module can generate the two-dimensional images in at least three different focal planes, wherein the spacing of the focal planes is equidistant or not equidistant.

Furthermore, the digital image generation module can in addition represent, in at least one image, a marking or another item of information in one of the focal planes and/or in a further focal plane which coincides with none of the different focal planes in which the two-dimensional images of the object are represented.

The representation device according to the invention can have an acquisition module which compiles acquisitions from different object planes of the three-dimensional object to be represented and conveys them to the control unit. The acquisition module can e.g. be formed like an acquisition module of a laser scanning microscope or a light-field camera.

However, it is also possible for synthetic image data, which are derived from a computer model, to be conveyed to the control unit. In addition, it is possible for image data which are derived or calculated from an available image data set (e.g. stereo image pair or image stack) to be conveyed to the control unit.

The representation device according to the invention can be formed in particular as a digital surgical microscope.

In addition, the digital image generation module can have a plurality of pixels for generating the two-dimensional images, wherein each pixel which is to represent an image section not set to dark is assigned exactly to one focal plane. However, it is also possible for a pixel for representing image sections not set to dark to be assigned to several of the different focal planes.

The control unit can correct the image data in order to improve the three-dimensional impression. In particular, it can perform a correction which compensates for a change in the magnification caused by the image generation module.

Furthermore, it is possible for the control unit to generate two-dimensional images of the object which are based on several acquisitions. In particular, two-dimensional images with increased depth of field can be generated in this way.

The multifocal representation device can have a view device for a single observer. It is also possible for it to have two view devices for two observers, wherein the digital image generation module is provided for at least one of the two observers.

The control unit can, in particular, control the digital image generation module in such a way that the images of the object from at least two different object planes are generated in the corresponding different focal planes. The control unit can further control the optionally provided acquisition module.

The multifocal representation device can have a further digital image generation module which, based on the two-dimensional image data conveyed by the control unit, generates two-dimensional images of the object from at least two different object planes in corresponding different focal planes in such a way that an observer can focus with his second eye on the different focal planes in order to perceive the represented object three-dimensionally, wherein the control unit determines a sharpness value in sections for each two-dimensional image to be represented with the further digital image generation module and sets to dark the image data for the image sections the sharpness values of which lie outside a sharpness value range predetermined for the image, and wherein the control unit provides the image data for the two digital image generation modules in such a way that the two digital image generation modules offer different perspectives of the object. Thus, in addition to the perception of depth due to the possibility of accommodation, an observer is also provided with the perception of depth by means of stereoscopic vision (offering the different perspectives). The three-dimensional impression for the observer is thus further improved.

The object is achieved in certain embodiment of a multifocal representation method where, for each two-dimensional image to be represented, a sharpness value is determined in sections and, during the image generation, the image sections the sharpness value of which lies outside a sharpness value range predetermined for the image are set to dark. Thus an undesired reduction in contrast can be prevented in the multifocal representation method.

In particular, in the case of each two-dimensional image to be represented, it is possible to use, in the image sections in which the sharpness value lies within the sharpness value range predetermined for the image, the corresponding image information to represent the object.

The multifocal representation method can be developed in the same way as the multifocal representation device (including its further development) according to the invention. In particular, it can have the method steps indicated in connection with the description of the multifocal representation device according to the invention.

It is understood that the features mentioned above and those yet to be explained below can be used not only in the stated combinations but also in other combinations or alone, without departing from the scope of the present invention.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention.

Figure 1:
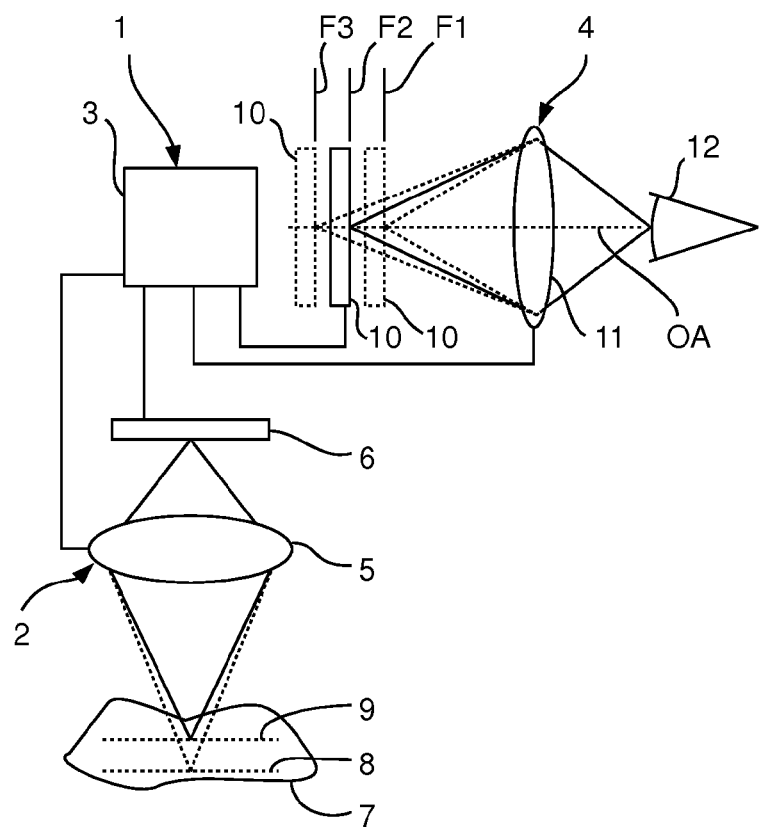
FIG. 1 is a schematic representation of an embodiment of the multifocal representation device according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the multifocal representation device 1 according to the invention is formed as a digital microscope with an acquisition module 2, a control unit 3 and a digital image generation module 4.

The acquisition module 2 comprises an acquisition optical system 5, which is shown here schematically as a lens, and a detector 6, wherein by means of the acquisition optical system different planes of an object 7 to be acquired can be imaged sharply onto the detector 6, which is formed e.g. as a surface detector (for example a CMOS or CCD sensor). For clarification, a first object plane 8 and a second object plane 9 are drawn in FIG. 1.

Of course, the acquisition module 2 does not have to be formed such that a conventional imaging of the corresponding object plane 8, 9 onto the detector 6 occurs. For example, the acquisition module 2 can also be formed like an acquisition module of a laser scanning microscope.

The data acquired by the detector 6 are conveyed to the control unit 3, which processes them for the digital image generation module 4. The digital image generation module 4 comprises an image generator 10, with which a two-dimensional image to be represented can be generated, and a detection optical system 11, which here is formed as an eyepiece and with which the image generator 10 is imaged in such a way that an observer (represented here schematically by a drawing of an eye 12) can perceive the image generated by the image generator 10. The detection optical system 11 is further designed in such a way that, for the observer, the image generator 10 can lie in different focal planes F1, F2, F3. This is indicated by the two positions of the image generator 10 represented by dashed lines. For this, the detection optical system 11 can have at least one variable optical element (such as e.g. a liquid lens), which can be controlled by means of the control unit 3. The different focal planes F1-F3 are altered or advanced by the detection optical system 11 so quickly that an observer cannot distinguish between the individual focal planes F1-F3 in time. The observer effectively sees a multifocal final image and can accommodate to the different focal planes F1-F3, with the result that he can perceive sharply the image generated in the respective focal plane by the image generator 10. Focal planes on which he is not directly focusing are also visible to the observer. However, these appear, as in normal vision, to be slightly blurred. This is caused by the finite depth of field of the human eye. By means of the multifocal image reproduction, the observer obtains additional depth information since he is able to distinguish sharp image portions, from the focal plane, from less sharp image portions, from other focal planes. In the different focal planes F1-F3 different images of the object 7 are presented to the observer such that a three-dimensional image impression results for the observer because, by altering the accommodation state of his eye 12, he focuses on sections of the object 7 which appear to be different distances away and thus he obtains a three-dimensional image impression.

As the observer always perceives all generated images in the different focal planes F1-F3 (the image of focal plane F2, to which he accommodates, he perceives to be sharp, the images of the other focal plane F1, F3 he perceives to be blurred), a normal representation of the complete images of the object planes 8, 9 in each case would lead to a loss in contrast which increases sharply with the number of the different focal planes F1-F3. In order to prevent or at least reduce such a loss in contrast, in the multifocal representation device 1 according to the invention, for each image to be represented of a focal plane F1-F3, which corresponds to an object plane 8, 9, the image section or the image sections which would be perceived sharply when the object 7 is viewed are determined. This image section or these image sections are represented in the desired way and the remaining image sections of the image to be represented are not represented but are set to dark. Thus, by means of the image generator 10 in the respective focal plane F1-F3 only the sharp image section(s) are represented bright and the remaining image sections are represented dark. Thus, the image sections which are blurred in the respective focal plane F1-F3, and are now no longer represented or are now represented dark, no longer lead to an undesired loss in contrast. The corresponding determination of the sharp image sections and the resultant generation of the image data for the image generation module is carried out by the control unit 3.

Figure 2A:
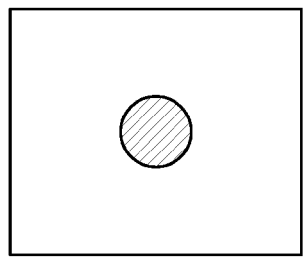
FIGS. 2A, 2B and 2C are schematic representations to explain the image sections to be represented in the individual focal planes.
Figure 2B:
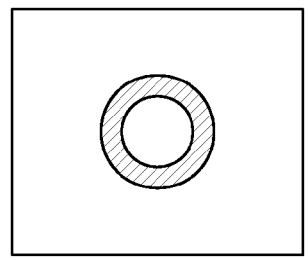
Figure 2C:
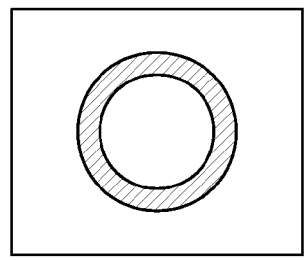
Figure 3:
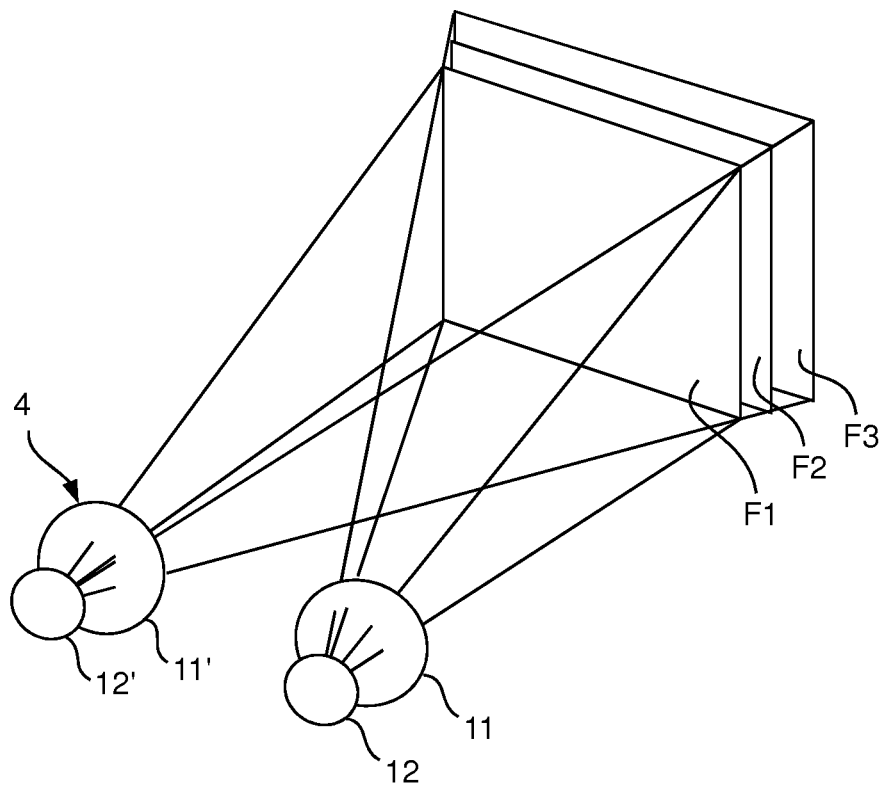
FIG. 3 is a perspective schematic representation of an embodiment of the digital image generation module in FIG. 1.

If the object 7 to be represented is, for example, spherical, the image to be represented for the first focal plane F1 could be the circle represented schematically in FIG. 2A. In this representation, as also in the representations in FIGS. 2B and 2C, the sections to be represented bright are shaded. The unshaded areas are to be represented dark. The image for the focal plane F2 would then be the circular ring represented in FIG. 2B, the internal diameter of which corresponds approximately to the diameter of the circle from FIG. 2A. For the focal plane F3, the image to be represented would be the circular ring according to FIG. 3C, wherein the internal diameter of this circle corresponds approximately to the external diameter of the circular ring from FIG. 2B.

In this way, a three-dimensional image impression is provided to the observer as he can apparently accommodate freely within the represented image (i.e. the images of the different focal planes F1-F3 generated quickly one after the other in time). Even if the digital image generation module 4 is formed monocular the desired three-dimensional image impression is present. Of course, the digital image generation module 4 can also be formed as a binocular image generation module. A schematic perspective representation of such an image generation module 4 is shown in FIG. 3, wherein again the three focal planes F1, F2, F3 (here without image generator 10) are shown. For each of the observer's eyes 12 and 12' a corresponding eyepiece optical system 11 and 11' is provided.

The binocular image generation module 4 can, in particular, be developed in such a way that in addition a perspective stereo impression is also provided. In this case the structure of the image generation module 4 according to FIG. 1 is doubled, with the result that, for each stereo channel (each eye) a digital image generation module of its own is provided and different perspectives can be offered for the two stereo channels, which perspectives in each case however are represented as a multifocal final image in the manner described. Thus the user is provided with both the perception of depth which arises because accommodation is possible, and the perception of depth by means of stereoscopic vision.

In order to determine for each focal plane F1-F3 the sections to be represented sharp, known methods can be used in order to determine a sharpness value in sections or locally. A section can be defined as a section that is sharp, and thus to be represented, when the corresponding sharpness value lies within a predetermined sharpness value range. If it does not lie within this sharpness value range, the section is to be represented dark as a blurred section. For this, e.g. the method described in Forster et al., "Complex Wavelets for Extended Depth-of-Field: A New Method for the Fusion of Multichannel Microscopy Images", Microscopy Research and Technique 65:33-42 (2004) for the local determination of sharpness using discrete wavelet transformation can be used.

Other methods are, of course, also possible. In the case where the acquisition module 2 is formed as a stereoscopic arrangement, the determination of the sharpness values can be carried out similarly to a conventional autofocus sensor of a camera by locally evaluating the parallax displacement. A local correlation or assessment of the optical flow between the stereo channels can be carried out.

In the multifocal representation device 1 according to the invention image portions from different object planes 8, 9 can thus be represented in corresponding image planes (focal planes F1-F3), wherein only those image portions are shown which are sharp. Blurred image portions are not represented with the result that the image generator 10 represents a dark or a black value for these image portions. Thus no disruptive light, which can reduce the in-image contrast in the individual represented image and in particular in the multifocal final image, is generated in the blurred image portions. The observer can thus refocus in the represented image, whereby he receives a three-dimensional image impression. At the same time no undesired loss in contrast occurs.

In the description hitherto three different focal planes F1, F2 and F3 were represented by means of the digital image generation module 4. Of course, two or more than three different focal planes can also be represented. In particular, e.g. four to ten different focal planes can be represented.

As image generator 10 e.g. at least a tilting mirror matrix, an LCD module or another flat light modulator can be used, wherein in this case of course the corresponding illumination source is still provided. The image generator 10 can thus be a passive image generator. However, it is also possible for the image generator 10 to be an active image generator which requires no separate illumination source. Such flat (passive or active) image generators 10 as a rule have pixels, which can be controlled independently of each other, arranged in rows and columns.

To generate the different focal planes, the detection optical system 11 can also be formed as an optical system with variable focusing (e.g. conventional slide focus).

Figure 4:
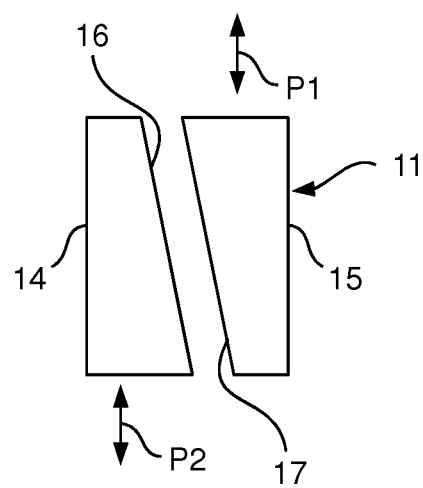
FIG. 4 is a schematic representation of an embodiment of the detection optical system of the digital image generation module.

Furthermore, it is possible for the detection optical system 11, as is shown in FIG. 4, to have two elements 14, 15 which are not plane-parallel, and the opposite surfaces 16, 17 of which are formed complementary to each other, wherein at least one of the elements 14, 15, as is indicated by the double arrows P1 and P2, is movable transverse to the imaging direction or transverse to the optical axis OA of the detection optical system 4 (FIG. 1). The surfaces 16, 17 can e.g. satisfy the equation of an nth-degree polynomial, wherein n can be an integer greater than or equal to 3.

In order to generate the different focal planes F1-F3 it is also possible to move the image generator 10 along the optical axis OA of the image generation module 4. Furthermore, for a simultaneous image representation, it is possible to provide a separate image generator 10 for each focal plane, wherein the image generators 10 are presented to the observer's eye 12 superimposed optically. Of course, any desired combinations of the possibilities described (e.g. time-sequential and simultaneous image representation) are also possible for generating the images in the different focal planes F1-F3.

In the description hitherto it was assumed that the bright areas of the images of the different focal planes do not overlap but are adjacent to each other. Effectively every pixel of the image generator 10 is thereby assigned exactly to one focal plane F1-F3. However, depending on the design of the detection optical system 11, it is possible that a change in the magnification of the image represented by the image generator 10 is brought about for the different focal planes F1-F3. The result of this would be that, to an observer accommodating his eye 12 to a focal plane (e.g. focal plane F2), the information of the image content to be represented, which is sharp in the other focal planes (here focal planes F1 and F3) and is represented there, does not appear at the position which corresponds to natural vision but is slightly offset. This shift in position which does not correspond to the normal visual impression can be counteracted by a corresponding digital correction of the image data. Thus e.g. a corresponding resizing can be carried out for the different focal planes F1-F3, with the result that the observer receives a natural and geometrically correct impression. This leads to some pixels of the image generator no longer being assigned to exactly one focal plane but to several. For these pixels, which are assigned to several focal planes F1-F3 (which are therefore to represent bright image elements in several focal planes), the brightness is adjusted for the different focal planes, with the result that, in the superimposition of the images of the different focal planes F1-F3, the brightness corresponding to the natural visual impression is again present.

Digital correction of the image data can, e.g., also be used to correct image errors (such as distortion) in the individual images. This is particularly advantageous when the image errors change sharply between the individual focal planes.

The described shift in position can also be counteracted in that the accommodation state of the eye 12 and thus the focal plane viewed by the observer and/or the line of sight and thus the most probable focal plane are determined and correspondingly represented.

Moreover, it is possible to design the acquisition optical system 5 and/or the detection optical system 11 telecentrically. Thereby e.g. magnification errors can be counteracted.

Previously it was assumed that the focal planes F1-F3 are chosen to be equidistant. However, it is also possible for the focal planes in the representation to be chosen not equidistant. This is advantageous e.g. when an observer has to monitor two areas which have a large axial spacing (in comparison with the depth of field of the acquisition optical system 5), wherein there is no image information in the depth area between them. This can occur in the field of surgery e.g. in the case of operations in narrow ducts. Thus e.g. in neurological operations regions on the surface and in the depth of the duct are of interest. In this way, for example with a fixed number of focal planes F1-F3 which can be represented, the distance between the first and last focal plane can be increased if there is no sharp image content in intermediate focal planes. In the case, for example, of six representable focal planes, three can be used for the operation surface and three for the deep area in the operation duct. The spacing of the focal planes within the two areas is in each case smaller than between the two areas.

If the images to be represented were acquired with the aid of one (or more) acquisition modules 2, wherein the number of the acquired object planes 8, 9 is greater than the number of representable focal planes F1-F3, an image to be represented in a focal plane F1-F3 can be calculated with increased depth of field in each case e.g. from the acquisitions of several object planes 8, 9. One image which has been calculated from several acquisitions from different object planes 8, 9 is therefore calculated for each focal plane F1-F3 of the digital image generation module 4, wherein again the areas which are to be represented blurred are represented dark. Thus an image with increased depth of field is then present in the respective focal plane F1-F3, wherein the observer can again accommodate freely between the different focal planes F1-F3 and thus obtain a three-dimensional image impression.

The imaging according to the invention of a focus stack (or of a virtual image stack) in several focal planes F1-F3 also makes it possible to add augmentations in at least one of the focal planes F1-F3. Thus, e.g., a marking, such as e.g. an arrowhead, can be added in a particular focal plane F1-F3 of the virtual image stack during the generation of the corresponding image or of the corresponding image data for the image generator 10. The observer's attention can thereby be directed onto the relevant focal plane F1-F3. The observer thus obtains not only information about the lateral position of the marked image section but also about the axial position as a result of the augmentation in at least one of the focal planes. This is advantageous e.g. in the field of digital microscopy for surgery.

In the augmentation described, the marking provided in the image in the corresponding focal plane F1-F3 can result in the original image information at this point being lost or overwritten. This becomes even more relevant if more markings or items of information, such as e.g. letters or numbers, are displayed. Therefore, in a further development, a separate focal plane, which lies immediately in front of or behind the actual focal plane F1-F3, can be provided for the augmentation or the information to be overlaid. It is thus made possible for the observer to concentrate either on the relevant focal plane F1-F3 with the original image content or on the focal plane with the augmentation. The original image content thus remains unchanged and can be viewed, except for a small loss in contrast through the additional focal plane with the augmentation, since a real covering or overwriting of the original image information does not occur.

The digital image generation module can e.g. in a further development be formed for two observers, wherein for the second observer, in the same way, the possibility of accommodation according to the invention can either be provided or not. In this embodiment, for example the focal plane at which the first observer is looking precisely can then be marked for the second observer. For this, e.g. contour lines can be overlaid and/or the augmentations described above can be carried out. For this embodiment, the image generation module 4 is designed e.g. such that the focal plane and/or the line of sight of the first observer can be determined.

In the embodiments described hitherto it was assumed that the image data to be represented are based on image acquisitions actually carried out.

However, it is also possible for the image contents that are to be represented to be synthetic data which can be determined for example from a 3D model (e.g. described by 3D vectors and textures). Based on the 3D model it is thus possible to calculate which portions lie closest to which focal plane. Thus the sharp image portions can then be determined for the individual focal planes.

If the image data to be represented are data which were obtained with the aid of a pair of stereo cameras or using other optical or non-optical methods, which are "3D-capable" (such as e.g. by means of a plenoptic camera or (optical) tomography after converting the data), the z position of a particular image point can be determined via a stereo correlation (if the depth of field of the camera optical system used covers the depth area of the volume observed). In the case of non-transparent objects, the topography of the surface can thereby be reconstructed. Each image point can then be clearly assigned to a corresponding image plane according to its z position. Blurred image portions, which reduce the contrast in the multifocal final image, can be eliminated.

According to the invention, it is thus possible, irrespective of the way in which the image content to be represented was obtained, always to determine for a predetermined focus stack (meaning a stack of images which reproduces the image content to be represented with defined but different focal planes) the respective focal plane which is sharpest for each pixel of the image generator 10. Each image of this stack contains the sharp image contents (shown shaded in FIGS. 2A-2C) and empty regions (shown unshaded in FIGS. 2A-2C). For these empty regions, the corresponding pixels of the image generator 10 are switched to "black" in the representation. According to the invention, the generation of contrast-reducing light from other focal planes F1-F3, which would lead to a reduction in the contrast, is thus prevented. It is thus achieved that the in-image contrast of the image stack represented in this way corresponds to the in-image contrast of an individual image.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A multifocal representation device, comprising:
a digital image generation module; and
a control unit, configured to convey to the digital image generation module a two-dimensional image data of a three-dimensional object to be represented,
wherein the digital image generation module, based on the two-dimensional image data conveyed, is configured to generate two-dimensional images of the object from at least two different object planes in corresponding different focal planes such that an observer's eye can focus on the different focal planes in order to perceive the represented object three-dimensionally, and
wherein the control unit is configured to determine for each two-dimensional image to be represented a sharpness value in sections and to set the image data to dark for the image sections where a sharpness value lies outside a sharpness value range predetermined for the image.

2. The multifocal representation device according to claim 1, wherein the digital image generation module comprises a digital image generator and a detection optical system, wherein the detection optical system presents the image generator to an observer in different focal planes time-sequentially.

3. The multifocal representation device according to claim 1, wherein the digital image generation module comprises multiple digital image generators and a detection optical system, which represent the image generators to an observer in different focal planes simultaneously.

4. The multifocal representation device according to claim 1, wherein the digital image generation module is configured to generate the two-dimensional images in at least three different focal planes, wherein each focal plane is spaced equidistantly.

5. The multifocal representation device according to claim 1, wherein the digital image generation module is configured to generate the images in at least three different focal planes, wherein each focal plane is not spaced equidistantly.

6. The multifocal representation device according to claim 1, wherein the digital image generation module is configured to additionally present, in at least one image, at least one of a marking and another item of information, in one of the focal planes.

7. The multifocal representation device according to claim 1, wherein the digital image generation module is configured to additionally present at least one of a marking and another item of information in a further focal plane, the further focal plane coinciding with none of the different focal planes in which the two-dimensional images of the object are represented.

8. The multifocal representation device according to claim 1, wherein an acquisition module is provided, and which is configured to compile acquisitions from multiple different object planes of the three-dimensional object to be represented and is configured to convey the compiled acquisitions to the control unit.

9. The multifocal representation device according to claim 1, wherein the multifocal representation device comprises a digital surgical microscope.

10. The multifocal representation device according to claim 1, wherein the digital image generation module includes a plurality of pixels for generating the two-dimensional images, wherein each pixel which is to represent an image section not set to dark is assigned exactly to one focal plane.

11. The multifocal representation device according to claim 1, wherein the digital image generation module includes a plurality of pixels for generating the two-dimensional images, wherein a pixel for representing image sections not set to dark can be assigned to several of the different focal planes.

12. The multifocal representation device according to claim 1,
wherein a second digital image generation module is provided which, based on the two-dimensional image data conveyed by the control unit, generates two-dimensional images of the object from at least two different object planes in corresponding different focal planes such that an observer's second eye can focus on the different focal planes in order to perceive the represented object three-dimensionally, wherein the control unit is configured to determine a sharpness value in sections for each two-dimensional image to be represented with the further digital image generation module and to set to dark the image data for the image sections the sharpness value of which lies outside a sharpness value range predetermined for the image, and wherein the control unit provides the image data for both digital image generation modules such that the two digital image generation modules provide different perspectives of the object.

13. A multifocal representation method for the three-dimensional representation of an object, the method comprising:

generating two-dimensional images of the object from at least two different object planes in corresponding different focal planes such that an observer can focus with his eye on the different focal planes in order to perceive the represented object three-dimensionally;

determining, for each two-dimensional image to be represented, a sharpness value in sections; and setting to dark during the image generation the image sections where the sharpness value lies outside a predetermined sharpness value range.

* * * * *